June 13, 1939.  F. C. MATTHAEI ET AL  2,162,510
METHOD OF MAKING A TORQUE TUBE
Filed Jan. 30, 1937  2 Sheets-Sheet 2
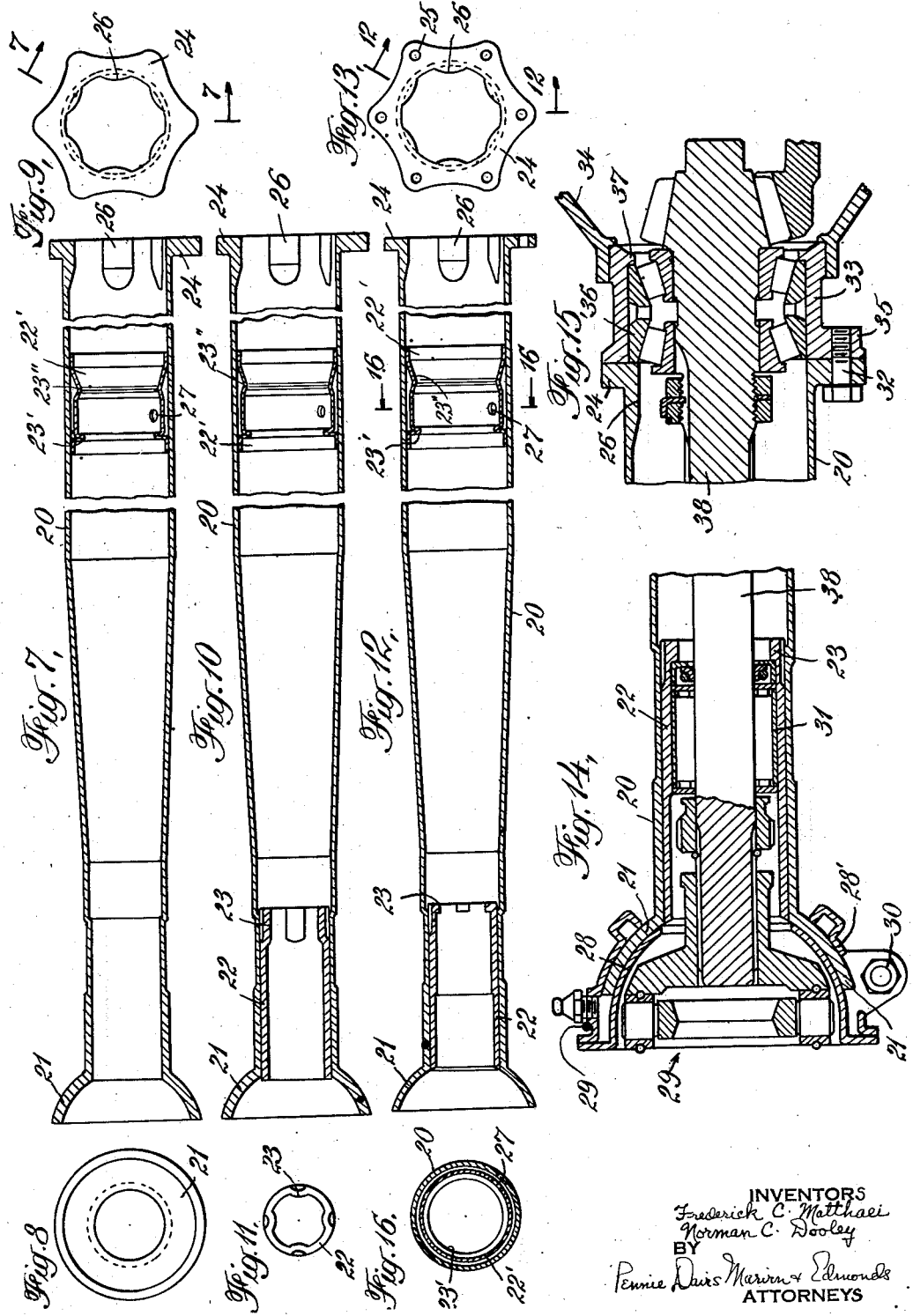
INVENTORS
Frederick C. Matthaei
Norman C. Dooley
BY
Pennie Davis Marvin & Edmonds
ATTORNEYS Patented June 13, 1939

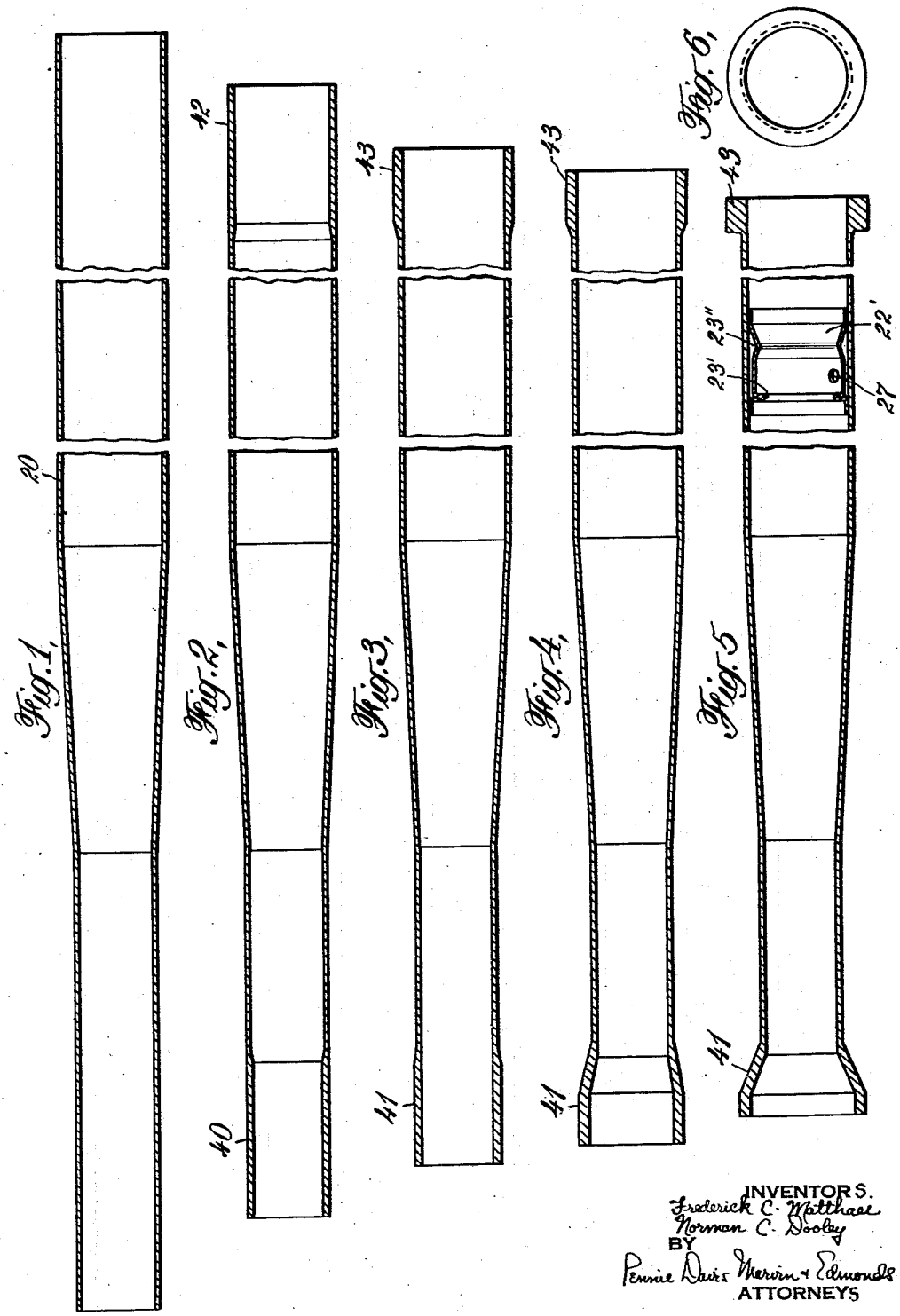

2,162,510

UNITED STATES PATENT OFFICE 2,162,510

METHOD OF MAKING A TORQUE TUBE

Frederick C. Matthaei and Norman C. Dooley, Detroit, Mich., assignors to American Metal Products Company, Detroit, Mich.

Application January 30, 1937, Serial No. 123,202

5 Claims. (Cl. 29—152)

This invention relates to transmission housings for motor vehicles and has particular reference to a novel housing for the propeller shaft of a vehicle and a new method by which the housing may be manufactured expeditiously and at low cost.

In motor vehicles as commonly made, a propeller shaft is connected at one end to a differential mechanism on the rear axle and at the other end to a universal joint near the front of the vehicle. It is the general practice to enclose the propeller shaft in a tube known as a torque tube, which extends between the rear axle housing and the universal joint housing. In order to connect the torque tube to the two housings, the tube has been made heretofore in three pieces, namely, the tube proper, a housing which fits over the universal joint housing, and a flanged member which is connected to the rear axle housing. In the manufacture of the three-piece assembly, the torque tube proper or shell is made into the desired tubular form and is generally tapered slightly toward the ends. A bell-shaped housing, which may be either forged or cast, is then welded to the front end of the shell. This housing fits inside an outer casing of the universal joint when the assembly is mounted on the vehicle. The flanged member which connects the shell to the rear axle housing is generally forged and is either pressed over or butt-welded to the rear end of the shell. The flange is formed with spaced openings which receive bolts for connecting the flange to the rear axle housing.

Torque tube assemblies of the three-piece type are objectionable for the reason that each of their component parts must be manufactured as separate units, and accordingly a large number of operations is required. Also, the connection of the bell-shaped housing and the flanged member to the ends of the shell requires additional time and expense.

The present invention is directed to the provision of a novel torque tube which is made in a single piece by a few operations and includes integral means for connecting the ends of the tube to the rear axle and universal joint housings.

A torque tube made in accordance with the present invention comprises a tubular shell made of metal, such as soft steel or the like. The metal at one end of the shell is upset to form a flared portion which fits over the inner casing of the universal joint. Preferably, the inside of the shell near the flared portion has means for holding a bearing for the propeller shaft in position within the shell. The metal at the opposite end of the shell is upset to form an outwardly extending flange which fits against the rear axle housing. In the preferred form of the tube, the flange is pressed into a scallop shape and the projecting portions of the flange are adapted to receive bolts for connecting the tube to the rear axle housing. The inside of the shell is preferably formed with integral lugs which are staggered with respect to the projecting portions of the scallop-shaped flange, and these lugs serve to hold another bearing in its proper axial position with respect to the propeller shaft.

In producing the new torque tube, a metallic shell is formed which is substantially longer than the desired length of the final unit. The front end of the shell is heated to a temperature at which the metal can be worked and is then subjected to one or more upsetting operations, which gradually increase the thickness of the wall near the front end of the shell and also open the end of the shell into the desired bell shape. Preferably, a sleeve is inserted into the front end of the shell when the latter is still at a high temperature, so that the shell in cooling will shrink around the sleeve. The sleeve serves the dual function of strengthening the front end of the shell and securing one of the propeller shaft bearings in position. The rear end of the shell is likewise heated to a working temperature and is then upset to form the outwardly extending flange. The flange is preferably formed by a series of upsetting operations, and in the final operations the flange is scalloped by suitable dies. In the formation of the scallop-shaped flange, we prefer to develop a flow of the heated metal from the indentations of the flange, that is, from the portions of the integral flange which are reduced in radial dimension because metal is not needed at these points, and flow that metal to other points where it will serve desirable ends. The portions of the flange of greater radial dimension are provided with openings for bolts by which the tube is secured to the axle housing. The number of these portions of greater radial dimension and the bolts associated with them required for adequate strength of the connection of the tube to the housing is such that these portions of greater radial dimension may be spaced apart circumferentially of the tube by substantial amounts and in these spaces the flange need not be of as great radial dimension and may therefore be reduced in radial dimension to supply metal at other points where it may be used to advantage. This metal may be caused to flow back from the end of the tube beyond the flange to form integral projections on the tube spaced apart circumferentially of the tube and aligned axially with the portions of the flange which are of reduced radial dimension, and in those positions the integral projections contribute substantially to the strength of the tube where strength is needed, that is, at the base of the flange. Preferably these integral projections spaced around the circumference of the tube are developed upon the interior wall of the tube, and, when so positioned, the integral projections may be utilized for the additional purpose of definitely locating a bearing for the propeller shaft passing through the tube.

It will be apparent that the new torque tube is made from a single tube by a few simple operations, and in its final form is ready for installation on the vehicle in the usual manner. The flange by reason of its scallop shape accommodates the connecting bolts with a small amount of metal, and both the flange and the lugs inside the flange are formed without removing any of the metal from the shell. Accordingly, the torque tube may be manufactured economically in commercial production.

For a better understanding of the invention reference may be had to the accompanying drawings illustrating one form of the new torque tube and the preferred method of making it. In the drawings:

Fig. 1 is a view of the shell in longitudinal section as it appears before the upsetting operations, with parts of the shell broken away;

Figs. 2 to 5, inclusive, are similar views of the shell at successive stages in the upsetting operations;

Fig. 6 is a rear end view of the shell as it appears in Fig. 5;

Fig. 7 is a view of the shell in longitudinal section, with parts thereof broken away, showing each end of the shell in another stage of the upsetting operations;

Figs. 8 and 9 are front and rear end views, respectively, of the shell as shown in Fig. 7;

Fig. 10 is a longitudinal section of the shell, with parts thereof broken away, showing the ends of the shell in still another stage of the operations;

Fig. 11 is a rear end view of the sleeve which is inserted in the front end of the shell;

Figs. 12 and 13 are sectional and rear end views, respectively, of the torque tube in its final form;

Figs. 14 and 15 are views in section showing the ends of the tube connected to the housings for the universal joint and rear axle, respectively; and Fig. 16 is a section on the line 16—16 of Fig. 12.

The preferred form of the new torque tube is shown in Figs. 12 and 13 of the drawings. As there shown, the torque tube comprises a tubular shell 20 which is tapered toward its forward end. the front end of the shell is flared to form a bell-shaped housing 21, and secured to the inside of the shell near housing 21 is a sleeve 22. The latter is provided on its inner surface near the rear end thereof with a plurality of circumferentially spaced integral lugs 23. At its opposite end the shell 20 has an outwardly extending peripheral flange 24 which is likewise integral with the shell. As shown particularly in Fig. 13, the flange 24 is scallop-shaped and each of the projecting portions thereof has an opening 25 drilled therethrough for the reception of a bolt. Integral lugs 26 are formed on the inner surface of the shell between adjacent projections of the scalloped flange 24, that is, in radial alignment with the indentations of the flange. A second sleeve 22' of metal is preferably disposed in the shell 20 near the middle thereof and held against axial displacement by spot welding between the sleeve and shell. A section of sleeve 22' intermediate its ends is spaced from the wall of the shell and at one end of the intermediate section is an inwardly extending annular flange 23', while at the other end of the section is an inwardly extending annular rib 23''. The sleeve 22' may be conveniently made in a single piece in which the rib 23'' and the intermediate section adjacent it are formed by a suitable die. The flange 23' may then be formed by heating the sleeve to a temperature at which the metal can be worked and forcing the metal near the front end of the sleeve inwardly, as shown. The shell 20 and sleeve 22' are provided with aligned openings 27, the opening in the shell being threaded to receive an oil plug (not shown) removable therefrom.

In the installation of the torque tube, the bell-shaped housing 21 is machined on the inside to fit over the inner casing 28 of the universal joint 29 of the vehicle, and an outer casing 28' is secured in position over the housing 21 in any suitable manner, as by means of the bolt and nut assembly 30 (Fig. 14). The inside of sleeve 22 is machined to receive a roller bearing 31 which abuts at its inner end against the lugs 23 in the sleeve. The flange 24 at the other end of shell 20 is connected by bolts 32 to a bearing retainer 33 forming part of the rear axle housing 34. The bolts 32 extend through the openings 25 in the flange 24 and are threaded into a flange 35 on the bearing retainer (Fig. 15). A bearing 36 is mounted in the bearing retainer 33 and is held against axial displacement between an annular rib 37 in the retainer and the lugs 26 in the shell. A propeller shaft 38 extends from the universal joint 29 through the tubular shell 20 to the rear axle housing 34 and is supported near its ends in the bearings 31 and 36. Intermediate its ends, the shaft 38 is supported by a suitable bearing (not shown) retained in the sleeve 22', the bearing being held against axial movement by the flange 23' and rib 23''. The bearing in sleeve 22' serves to prevent sagging of the middle portion of the shaft 38 and also to prevent or reduce vibration thereof during the transmission of torque. By means of the aligned openings 27 in the shell 20 and sleeve 22', convenient access may be had to the bearing in sleeve 22' for oiling it.

In accordance with the preferred method of the present invention, the torque tube is made by first forming the tubular shell 20, as shown in Fig. 1. Preferably, the shell is formed with an intermediate section which tapers toward the front end of the shell. A convenient way of making the shell is to roll a strip of sheet metal into the desired tubular shape and weld the adjoining edges of the strip to form a continuous joint. The shell 20 in its initial form is substantially longer than the desired length of the finished torque tube. I have found that where the metal of the shell is about one-eighth of an inch in thickness, the shell in its initial form may be from four to five inches longer than the desired length of the finished tube.

In forming the front end of the torque tube, the shell 20 is heated for a substantial distance inwardly from its front end to a temperature at which the metal can be worked, and is subjected to an inside upsetting operation to form an upset portion 40, as shown in Fig. 2. The upsetting operation may be performed with a suitable die and plunger or the like. The front end of the shell is then subjected to an outside upsetting operation which forces the metal of the inside upset 40 to the outside of the shell to form an upset portion 41 (Fig. 3). The latter is shorter than the upset portion 40 and therefore thicker. Following the outside upsetting operation, the front end of the shell is subjected to two more upsetting operations which gradually widen the mouth of the shell and increase the thickness of the metal of the upset portion 41, as shown in Figs. 4 and 5. In these operations, the upset portion is given a cylindrical form for a substantial distance inwardly from the end and is then tapered for a short distance. In the next operation, the upset portion 41 is further upset in a suitable die to form the bell-shaped housing 21 (Fig. 7).

After the housing 21 is formed and while the front end of the shell is at a high temperature, the sleeve 22 is inserted therein, as shown in Fig. 10, so that the shell in cooling will shrink into a binding engagement with the sleeve and hold it securely in position. If desired, the sleeve 22 may be spot welded to the shell to positively secure the sleeve against displacement. The front end of the shell may then be finished by machining the inside of housing 21 to fit the inner casing 28 of the universal joint, and machining the inside of sleeve 22, as shown in Fig. 12.

In forming the rear end of the torque tube, the shell is heated to a working temperature for a substantial distance inwardly from the rear end and is subjected to an inside upsetting operation to form an upset portion 42 on the inside of the shell (Fig. 2). The rear end of the tube is then further upset to force the metal of the inside upset 42 to the outside of the shell and form an outside upset 43, as shown in Fig. 3. Thereafter, the upset portion 43 is subjected to two more outside upsetting operations which shorten its length and correspondingly increase its thickness, as shown in Figs. 4, 5 and 6. As a result of these operations, the upset portion 43 takes the form of an outwardly extending peripheral flange on the shell. Preferably, at this stage in the operations the sleeve 22' is inserted in the shell through the rear end thereof and spot welded to the shell in the desired position. A convenient method for positioning the sleeve 22' before welding it to the shell is to form the openings 27 in the shell and sleeve before the sleeve is inserted and then adjust the sleeve in the shell until the openings 27 are in alignment. In the next operation, the rear end of the shell is still further upset, and at the same time the metal forming the upset portion is forced inwardly at spaced intervals along its periphery to form the scallop-shaped flange 24 (Figs. 7 and 9). The flange 24 may be formed with a suitable die and plunger, and the metal which is forced inwardly during the operation provides the necessary metal for lugs 26. The rear end of the torque tube is then finished by machining the end of the flange and the lugs 26 and drilling openings 25 through the projecting portions of the flange (Figs. 12 and 13).

It will be understood that in upsetting the metal at the ends of the shell and forming the scallop-shaped flange, the ends of the shell are heated to a temperature at which the metal is readily workable under the action of the forming tools. All of the operations for forming the ends of the torque tube may be performed in a single heating of each end of the shell, or the shell may be reheated at intervals during the operations.

It will be apparent that the new torque tube may be made in a few simple operations without resorting to the assembly operations which are necessary in making torque tubes of the three piece type. We have found that the initial upsetting of the metal on the inside of the shell greatly facilitates the subsequent outside upsetting operations and prevents lapping of the metal in the formation of the upset portions. By reason of our new method, the torque tube of the present invention may be made with less metal and in fewer operations than torque tubes as constructed heretofore, and accordingly may be made at lower cost.

We claim:

1. The method of making a torque tube in a single piece which comprises forming a tubular shell of sheet-metal and working the metal at one end of the shell back from the end of the shell to gather metal, and outwardly to form a thickened flange of varying radial dimension, and axially at points spaced apart around the circumference of the tube to form projections upon the wall of the tube adjacent to the flange and extending axially of the tube from the flange and corresponding in position circumferentially of the tube to the portions of the flange of less radial dimension.

2. The method of making a torque tube in a single piece which comprises forming a tubular shell of sheet-metal and working the metal at one end of the shell back from the end of the shell to gather metal, and outwardly to form a thickened flange of varying radial dimension, and axially at points spaced apart around the circumference of the tube to form projections upon the inner wall of the tube adjacent to the flange and extending axially of the tube from the flange, and corresponding in position circumferentially of the tube to the portions of the flange of less radial dimension, and shaping the end walls of the said projections toward the flanged end of the tube to lie in a plane transverse to the axis of the tube.

3. The method of making a torque tube in a single piece which comprises forming a tubular shell of sheet-metal and working the metal at one end of the shell back from the end of the shell to gather metal, and outwardly to form a flange having parts of greater radial dimension alternating with parts of less radial dimension, and axially of the tube at circumferentially spaced points corresponding to said portions of the flange of less radial dimension to form a plurality of projections on the surface of the shell extending axially from the flange.

4. The method of making a torque tube in a single piece which comprises forming a tubular shell of sheet-metal and working the metal at one end of the shell back from the end of the shell to gather metal, and outwardly to form a flange having parts of greater radial dimension alternating with parts of less radial dimension, and inwardly at circumferentially spaced points corresponding to said portions of the flange of less radial dimension to form a plurality of projections on the inner surface of the shell extending in an axial direction away from said flange.

5. The method of making a torque tube which comprises forming a tubular shell of sheet-metal tapered near one end, up-setting the metal at the tapered end of the shell to form a bell-shaped housing, inserting in the other end of the shell a bearing retainer substantially larger in diameter than the internal diameter of said tapered portion of the shell whereby the retainer is secured against removal from said end of the shell, forming at least one projection on the inner surface of the shell near said other end for securing the retainer against removal from said last end of the shell, and inserting a second bearing retainer within the shell on the other side of said projection with its end abutting the projection to locate the second retainer in the shell.

FREDERICK C. MATTHAEI.
NORMAN C. DOOLEY.